July 10, 1962 F. A. HESTER 3,043,921

PIEZOELECTRIC TRANSDUCER FOR STEREOPHONIC PHONOGRAPH PICKUP

Filed Oct. 13, 1958

INVENTOR
FRANK A. HESTER
BY J. B. Burke
ATTORNEY

United States Patent Office 3,043,921
Patented July 10, 1962

3,043,921

PIEZOELECTRIC TRANSDUCER FOR STEREOPHONIC PHONOGRAPH PICKUP

Frank A. Hester, New York, N.Y., assignor to Clairex Corporation, New York, N.Y., a corporation of New York Filed Oct. 13, 1958, Ser. No. 766,914
21 Claims. (Cl. 179—100.41)

This invention relates to the art of phonograph pickups and particularly concerns a phonograph cartridge especially adapted for reproducing sound from binaurally and stereophonically recorded phonograph records.

Binaural records of one type conventionally are recorded with a single spiral groove in which the walls are inclined oppositely at about 90° to each other and 45° to the flat plane of the disk record. For this type of record it is necessary to provide a pickup which produces two electrical outputs responsive respectively to components of motion in directions substantially at right angles. Thus one output will be responsive to motion of the phonograph stylus in one direction and will develop no electrical output or response to motion in another direction at right angles thereto. Motion of the stylus in the other direction will produce an electrical response at the second output while developing no response to motion in the first direction perpendicular thereto.

Heretofore in binaural phonographs it has been conventional to provide two independent piezoelectric crystal elements mounted perpendicular to each other and linked to a stylus. One element responds to motion of the stylus in one direction and the other element responds to motion in a direction perpendicular thereto. Such an arrangement of elements is complex and costly and difficult to maintain in proper angular disposition with respect to the rotating record and oscillating stylus.

The present invention avoids the above and other difficulties while providing improved quality of recording by providing a mechanically symmetrical transducer employing a single piezoelectric element or assembly of elements which is responsive to two binaurally recorded channels simulaneously and independently of each other.

It is therefore a principal object of the present invention to provide a phonograph pickup for reproducing binaural sound in two independent channels from two perpendicularly disposed walls of a record groove.

It is a further object to provide a binaural phonograph pickup in which a single piezoelectric element is adapted to respond to movements in mutually perpendicular directions to produce two independent electrical outputs.

It is a still further object to provide a transducer for a binaural phonograph pickup including a mechanically symmetrical block formed with two mechanically equivalent sections, one section being a piezoelectrically active element and the other section being inert.

It is another object to provide a binaural phonograph pickup cartridge in which is a mechanically symmetrical transducer formed by two mechanically equivalent flat sections joined together at their faces, one or both of the sections being piezoelectrically active, and with a stylus having a generally conical tip mounted with its axis lying in the plane of junction of the sections.

Other and further objects and advantages of the invention will become apparent from the following detailed description taken together with the drawing wherein.

Figures 1, 2, 3, 4, 5, 6, 7, 8, 9, 10, 11, 12, 13:
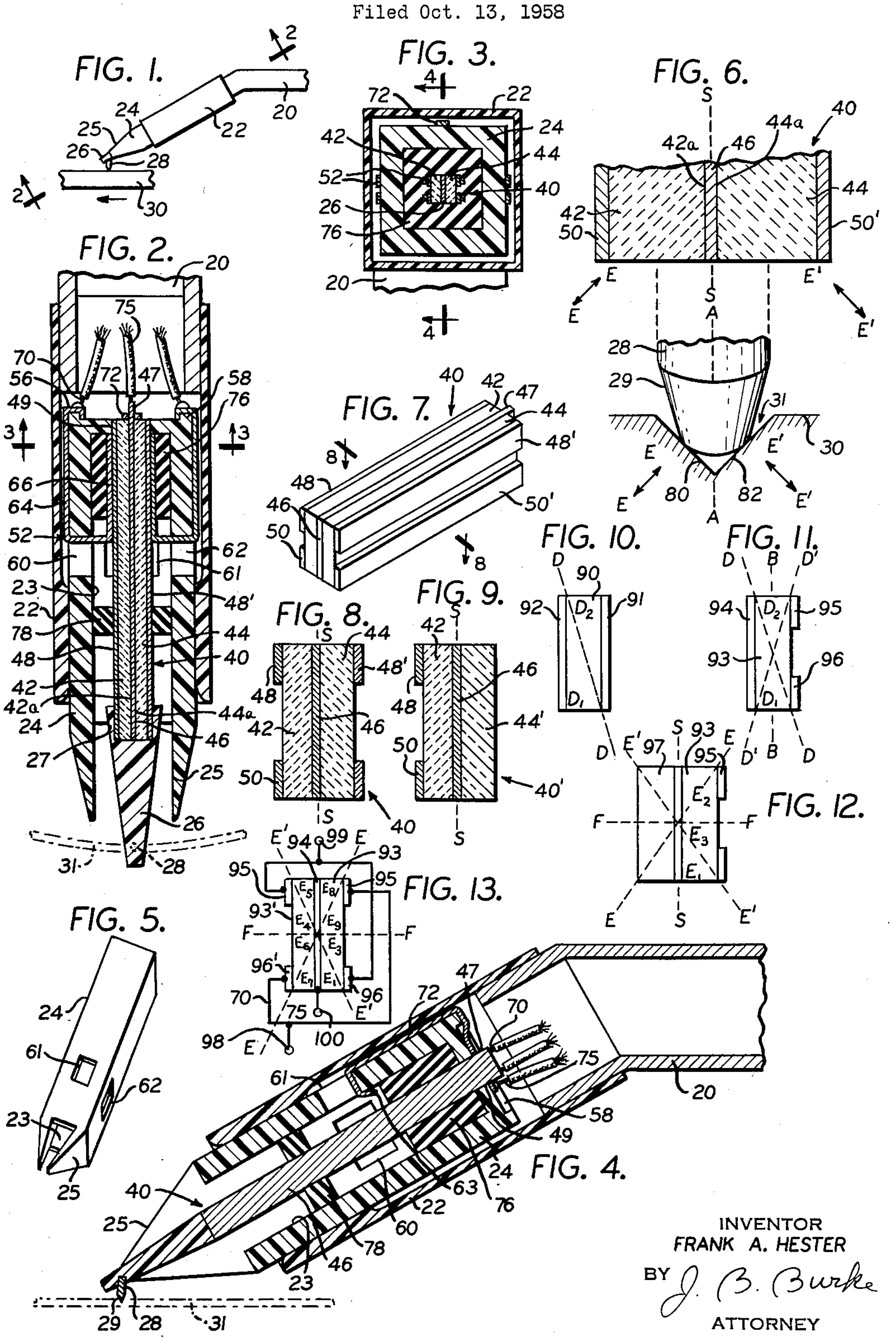
FIG. 1 is a side elevational view of a pickup embodying the invention.
FIG. 2 is a longitudinal sectional view on an enlarged scale taken on line 2—2 of FIG. 1.
FIG. 3 is a cross sectional view taken on line 3—3 of FIG. 2.
FIG. 4 is a vertical sectional view taken on line 4—4 of FIG. 3.
FIG. 5 is a perspective view on an enlarged scale with respect to FIG. 1 of a cartridge case employed in the pickup.
FIG. 6 is an oblique plan view partially diagrammatic on a magnified scale of a portion of a stylus and transducer element according to the invention.
FIG. 7 is a perspective view of a transducer, according to the invention.
FIG. 8 is a sectional view on an enlarged scale taken on line 8—8 of FIG. 7.
FIG. 9 is a sectional view similar to FIG. 8 of another transducer.

FIGS. 10 and 13 inclusive are end views partially diagrammatic of various transducers, useful in explaining the invention.

The pickup shown in FIG. 1 includes a tone arm 20 inserted in an open end of a sleeve 22 having a rectangular cross section. The other end of sleeve 22 is fitted over a cartridge case 24 best shown in FIG. 5. The case also has a rectangular cross section with a cavity 23. A needle shank 26 extends forwardly form the cavity of case 24 and carries a stylus 28. This stylus has a substantially conical point 29 disposed to ride in a groove 31 of the record disk 30 as best shown in FIG. 6.

The internal structure of the pickup is best shown in FIGS. 2–4, in which is mounted a transducer 40. This member may be in the form of a rectangular block formed of two flat rectangular slabs or sections 42 and 44. The two sections have their inner faces **42*a* and 44*a* juxtaposed to each other with a thin metal strip 46 disposed between the adjoining faces of the sections. Each section 42 and 44 is formed of piezoelectrically active material such as barium titanate, lead zirconium titanate, Rochelle salt or other piezoelectric solid material. According to the invention one section may be made of piezoelectrically inactive or inert material which may be a plastic such as phenolic or melamine formaldehyde, a ceramic such as porcelain or bisque, or other material. The two slabs on sections are securely bonded to opposite faces of an electrode in the form of a conductive strip 46** so that the transducer is a solid unit.

Two strips 48, 50 made of conductive material are disposed on the outer face of section 42 and two strips 48′, 50″ are disposed on the outer face of section 44. The strips may be formed as stripes of electrically conductive paint. The four strips form two flat spaced conductive elements or electrodes on each outer face of the two sections. Each strip is contacted by an individual U-shaped metal clip 52. Each clip has an upper hooked end 56 engaged over a ridge 58 on the closed end of cartridge case 24. This case is formed of some insulation material such as plastic. The case 24 is provided with rectangular openings 60 and 62 in opposite sides. These openings provide passages through which the bights of the U-shaped clips 52 are passed. One arm 64 of each clip abuts the outer side of the case and the inner arm 66 abuts one of the conductive elements 48, 48′, 50 or 50′. Two spaced clips pass through each of openings 60, 62. Wires 70 are soldered to the hooked ends of the clips respectively. Strip 46 has an outer extending portion or tail 47 which is engaged by the apertured end of another clip 72. This clip as best shown in FIG. 4 extends through opening 61 in the case and is bent over at its inner end 63 to insure a secure engagement of the clip of the recessed end of case 24. To the apertured end of clip 72 is soldered a ground wire 75. The wires 70 and 75 are coated or covered with insulation and extend inwardly into the hollow tone arm 20. The inner end of the transducer block is seated in a rectangular aperture 49 in the inner end of the case 24.

The several strips serve as mounting members for the transducer block in the case 24 in addition to providing electrical connectors to the electrodes 48, 48', 50, 50'. A hollow rectangular sleeve or pad 76 made of resilient material such as soft rubber or the like is interposed between the outersides of the transducer and the inner walls of the cavity 23 in the case. The pad provides a vibration damping means, insures that contact is effectively made by the clips against the outer faces of the transducer, and affords a secure mechanical support for the members in the case.

Another resilient pad 78 is disposed at an intermediate location between the ends of the transducer 40 and serves to limit or damp the transducer against excessive vibration in case 24. On the outer free end of the transducer block is removably engaged the slotted end 27 of shank 26. This is an electrically insulated member having the form of a truncated pyramid. It is preferably made of stiffly resilient or compliant material for maximum vibration damping. Suitable material for this purpose is a plastic such as nylon, polyethylene, or vinyl. Due to its geometrical symmetry, the shank 26 is equally compliant on both sides of its plane of symmetry to forces applied in directions perpendicular to diagonal planes intersecting the plane of symmetry.

Near the outer narrow end of the shank is mounted the stylus 28. The shank 26 extends just beyond the slotted tapered open end 25 of case 24. The stylus is mounted obliquely to the axis of the shank or so that the central axis of the pointed end of the stylus will be disposed at an acute angle to the plane of the disk record 30 and will be disposed in a vertical plane perpendicular to the plane of the record. The central axis A—A of the pointed end of the stylus is disposed so that it lies in the plane of mechanical symmetry S—S of the transducer as indicated in FIG. 6. Plane S—S is parallel to and lies between inner faces 42*a* and 44*a* of the members 42 and 44, bisecting the metal electrode 46 longitudinally.

When the stylus tip 29 is disposed in groove 31 of the record 30 forces will be directed as indicated in FIG. 6 in planar directions E—E and E'—E' perpendicular to the sides 80, 82 of the groove. These forces applied in mutually perpendicular directions will be applied through the resilient shank 26 to transducer 40 to generate the desired independent electrical outputs above mentioned as will now be explained with reference to FIGS. 10–13.

Referring now to FIGS. 10–13 to illustrate how two independent electrical outputs can be obtained from the single transducer, there is shown in FIG. 10 a piezoelectric crystal or ceramic element 90 which is in the form of a flat rectangular slab provided with electrodes 91 and 92 on opposite faces of the crystal. It is characteristic of such a structure that compression of the piezoelectric material will produce an electrical voltage of one polarity between electrodes 91, 92 and extension of the material will produce an electrical voltage response of opposite polarity. If this structure is bent at right angles to the diagonal plane D—D, the piezoelectric material in region $D_1$ on one side of plane D—D will be in compression and the material in region $D_2$ on the other side of the plane D—D will be in extension. These opposing excitations cancel each other in the element so that the net electrical voltage produced between the electrodes 91, 92 is zero.

In the arrangement of FIG. 11, the piezoelectric element 93 has a single electrode 94 on one face and two spaced electrodes 95, 96 on the other face. If element 93 is bent due to a force at right angles to the diagonal plane D—D, the piezoelectric material on one side of plane D as in region $D_1$ will be in compression and the material on the other side of the plane in region $D_2$ will be in extension. An electrical output will now be produced between electrodes 94 and 96 which is predominantly characteristic of extension and an electrical output will be produced between electrodes 94 and 95 which is substantially one of compression. If the bending force is applied perpendicular to diagonal plane D'—D' the polarities of the voltage developed will be reversed. Planes D—D and D'—D' intersect in the central plane of geometrical, electrical and mechanical symmetry of element 93.

In the arrangement of FIG. 12 there has been added to the piezoelectric element 93 a mechanically compliant but piezoelectrically inert slab 97 on the flat electrode 94. For simplicity in fabrication, the two slabs may be of the same size, mass and compliance so that their mechanical wave transmission characteristics will be the same. It will be necessary, however, that the size, mass and compliance of both slabs be the same if they are adjusted relative to each other so that both slabs are mechanically equivalent. This condition of mechanical equivalency will exist when the mechanical wave transmission characteristics of both slabs are identical so that the planes of electrical and mechanical symmetry coincide and bisect the transducer of FIG. 12 in the central plane S—S. The effect of adding the inert slab 97 to the piezoelectric element 93 is to shift the plane of mechanical symmetry of element from plane B—B to S—S.

The enlarged block structure of FIG. 12 has two diagonal planes of bending E—E and E'—E'. A force applied at right angles to plane E—E will now cause compression in the region $E_2$, $E_3$ above the plane E—E and will cause extension in region $E_1$ below the plane E—E. This region $E_1$ is one half of the volume of the element 93 lying below the mid-plane F—F of the element. The material in the region $E_3$ will be in compression. The volume of material in this $E_3$ region which is below mid-plane F—F is the same as that of region $E_1$. The compression in region $E_3$ opposes the extension in region $E_1$ so that the piezoelectric effect there is cancelled and the net electrical response between electrodes 94 and 96 is zero. The material in region $E_2$ above plane E—E is rectangular in cross section and is in compression. Thus there will be a voltage output developed between electrodes 94 and 95 which is characteristic of compression. Thus the output between electrodes 94 and 95 is responsive to bending of the structure at right angles to plane E—E while the output between electrodes 94, 96 is not responsive to such stimulus. Similarly a bending force applied parallel to plane E—E or perpendicular to plane E' will produce an electrical response between electrodes 94, 96 and no response between electrodes 94, 95.

FIG. 13 illustrates how the voltage output of the structure can be doubled or its impedance halved. This is done by employing two mechanically equivalent piezoelectric elements 93 and 93' having electrodes 95, 96 and 95', 96' respectively. Element 93' takes the place of inert block 97 and performs the same mechanical function in relocating the plane of mechanical symmetry from B—B to S—S where the plane of electrical symmetry is also located. Electrode 94 serves as the common output terminal of the two piezoelectric elements. Electrodes 95 and 96' can be connected together via wires 70 to a common terminal 98 to produce one electrical output, and electrodes 96 and 95' can be connected to the common terminal 99 to provide the other electrical output. The material of elements 93 and 93' will be oppositely polarized to develop a voltage of one polarity in one element on compression and voltage of the same polarity in the other element on extension and vice versa. Electrode 94 can be connected via wire 75 to the common terminal 100 in an external circuit as shown in FIG. 13, with electrodes 95 and 96' connected to terminal 98 for one electrical output and with electrodes 96 and 95' connected together for the other electrical output.

For forces applied in a direction at right angles to plane E—E the compression-extension cancellation in region $E_1$, $E_3$ and $E_4$, $E_5$ produces zero output at terminal 99 while an output is produced at terminal 98. Similarly for forces directed perpendicular to plane E'—E', an output will be developed at terminal 99 and no output will be developed at terminal 98 because of compression-extension cancellation in regions $E_6$, $E_7$ and $E_8$, $E_9$. FIGS. 7 and 8 illustrate on an enlarged scale the structure of the transducer employed in the pickup of FIGS. 2–4 applying the principles discussed in connection with FIGS. 12 and 13. The two mechanically equivalent piezoelectric bodies 42, 44 are sandwiched together in a laminated structure with the common electrode strip 46 to form a unit which is responsive mechanically and electrically to bending forces. Two strip electrodes 48, 50 and 48', 50' are provided on the outer faces of the structure. With the four diagonally located electrodes, the unit is responsive to forces applied in diagonal directions perpendicular to planes E—E and E'—E' shown in FIGS. 6 and 13 to produce two independent outputs as required for reproduction of binaurally recorded sound from a track 31.

In FIG. 9 the structure of the transducer 40' has been arranged to take advantage of the principles discussed in connection with FIG. 11. Piezoelectrically inert slab 44' similar to slab 97 has replaced the piezoelectrically active element 44 of transducer 40. The mechanical wave transmission properties of slab 44' are the same as that of element 42 so that the plane of mechanical symmetry S—S bisects electrode 46 longitudinally. Electrodes 48' and 50' have been removed since they have negligible mass. If desired these electrodes can be applied to the outer face of slab 44' in the same manner as shown in FIGS. 7 and 8. These electrodes will then serve as supplementary masses to balance the electrodes 48, 50. Clips 48' and 50' may be omitted because no electrical connections will be required to element 44'. In view of the similarities of transducers 40 and 40', the showing of FIGS. 2–4 may be regarded as illustrating use of a transducer in which one or both slab sections are piezoelectrically active.

If it is desired to employ the transducer 40 with two piezoelectric sections 42, 44 for reproduction of sound from a monaurally recorded record having lateral deviations in the spiral groove the two output terminals 98, 99 can be connected together, thereby subtracting audio signals produced by vertical components of motion of the stylus perpendicularly directed with respect to the horizontal record, and adding signals produced by lateral or horizontal components of motion of the stylus parallel to the plane of the record.

The structure of the pickup described is such that the entire cartridge including the cartridge case 24 and its contents can be readily removed from and replaced on the tone arm 20, and the stylus on its supporting shank can readily be removed from and replaced in the cartridge case. The hollow tone arm provides a convenient location for connecting the wires 70 and 75 as shown in FIG. 13.

What is claimed is:

1. A transducer for a stereophonic phonograph pickup, comprising an elongated flat block of rectangular cross section, said block including two flat slabs having inner faces secured to opposite faces of a thin conductive strip electrode, at least one of said slabs being a piezoelectric element, said strip electrode having its central plane located in the plane of mechanical symmetry of the block, said block having two spaced other electrodes extending along an outer face of one slab at opposite lateral edges thereof, said block being bendable alternately in directions perpendicular to diagonal planes intersecting said central plane, whereby independent voltages are developed between said strip electrode and the respective other electrodes.

2. A transducer according to claim 1, wherein the other of said slabs is a piezoelectrically inert element.

3. A transducer for a stereophonic phonograph pickup, comprising a flat block of rectangular cross section, said block including two flat slabs having inner faces secured to opposite faces of a thin conductive strip electrode, at least one of said slabs being a piezoelectric element, said slabs being mechanically equivalent and having equal mechanical wave transmission properties so that the transducer has a central plane of mechanical symmetry coinciding with and longitudinally bisecting said conductive strip, said block being bendable alternately in directions perpendicular to diagonal planes intersecting said central plane.

4. A transducer according to claim 3, wherein the other of said slabs is a piezoelectrically inert element.

5. A transducer for a stereophonic phonograph pickup, comprising an elongated flat block of rectangular cross section, said block including two flat slabs having inner faces secured to opposite faces of a thin conductive strip electrode, at least one of said slabs being a piezoelectric element, said piezoelectric element having two spaced electrodes mounted on an adjacent face of one slab near adjacent diagonal plane corners of said block, and individual contact elements connecting said electrodes respectively with circuit means exterior of said case, said block being mechanically symmetrical and having its plane of mechanical symmetry coinciding with the central plane of said strip, said block being bendable alternately in directions perpendicular to diagonal planes intersecting in said central plane, whereby independent voltages are developed between said strip electrode and the respective two spaced electrodes.

6. A transducer according to claim 5, wherein the other of said slabs is a piezoelectrically inert element.

7. A transducer for a stereophonic phonograph pickup, comprising a flat block of rectangular cross section, said block including two flat slabs having inner faces secured to opposite faces of a thin conductive strip electrode, at least one of said slabs being a piezoelectric element, said strip having a central plane disposed parallel to the opposed faces of said slabs, said slabs being mechanically equivalent so that the block is mechanically symmetrical, said strip electrode extending out of the block to provide an electrical terminal for said piezoelectric element, said block having two spaced other electrodes extending along an outer face of one slab at opposite lateral edges thereof, said block being bendable alternately in directions perpendicular to diagonal planes intersecting in said central plane, whereby independent voltages are developed between said strip electrode and the respective other electrodes.

8. A transducer according to claim 7, wherein the other of said slabs is a piezoelectrically inert element.

9. A transducer for a stereophonic phonograph pickup, comprising a flat block of rectangular cross section, said block including two flat piezoelectric slabs, said slabs having inner faces secured to opposite faces of a thin electrode, said slabs having equal mechanical wave transmission properties so that the block is mechanically symmetrical with its plane of mechanical symmetry longitudinally bisecting the block, said block having two spaced other electrodes extending along an outer face of one slab at opposite lateral edges thereof, said block being bendable alternately in directions perpendicular to diagonal planes intersecting in said central plane, whereby independent voltages are developed between said thin electrode and the respective other electrodes.

10. A transducer for a binaural phonograph pickup, comprising a flat block of rectangular cross section, said block including two flat piezoelectric slabs, said slabs having inner faces secured to opposite faces of a thin electrode, and two pairs of other electrodes, the electrodes in each of said pairs being spaced apart, one pair of said electrodes extending along opposite lateral edges of the outer face of one of the slabs, the other pair of said electrodes extending along opposite lateral edges of the outer face of the other of said slabs, said slabs having equal mechanical wave transmission properties so that said block is mechanically symmetrical with its plane of symmetry longitudinally bisecting the block and coinciding with a central plane of said thin electrode, said block being bendable alternately in directions perpendicular to diagonal planes intersecting in said central plane, whereby two equal voltages of the same polarity are developed between said thin electrode and two of the electrodes located at two diagonally opposite edges of the block, and two other equal voltages of the same polarity are developed between said thin electrode and another two of the electrodes located at two other diagonally opposite edges of the block.

11. A transducer for a stereophonic phonograph pickup, comprising a flat block of rectangular cross section, said block including two flat piezoelectric slabs, said slabs having inner faces secured to opposite faces of a thin electrode, said slabs having equal mechanical wave transmission properties and a pair of spaced other electrodes disposed on each outer face of said slabs parallel to the inner faces, said slabs being disposed with opposite polarization, said block being bendable alternately in directions perpendicular to diagonal planes intersecting in said thin electrode, whereby two equal voltages of the same polarity are developed between said thin electrode and two of the other electrodes located at two diagonally opposite edges of the block, and two other equal voltages of the same polarity are developed between said thin electrode and another two of the electrodes located at two other diagonally opposite edges of the block.

12. A transducer for a stereophonic phonograph pickup, comprising a flat block of rectangular cross section, said block including two flat piezoelectric slabs, said slabs having inner faces secured to opposite faces of a flat electrode, said slabs being equal in size and having equal mechanical wave transmission properties, and a pair of spaced other electrodes disposed on each outer face of said slabs parallel to the inner faces, said slabs being disposed with opposite polarization, said block being bendable alternately in two directions perpendicular to diagonal planes of the block intersecting said flat electrode, diagonally aligned electrodes of each pair of electrodes being electrically connected together outside of said block, so that application of a bending force perpendicular to one diagonal plane of said block develops a voltage between said flat electrode and only one connected pair of electrodes and application of another bending force perpendicular to another diagonal plane of the block develops a voltage between said flat electrode and only the other connected pair of electrodes.

13. A transducer for a stereophonic phonograph pickup, comprising a flat block of rectangular cross section, said block including two flat piezoelectric slabs, said slabs having inner faces secured to opposite faces of a thin flat electrode, said slabs being equal in size and having equal mechanical wave transmission properties, a pair of spaced other electrodes disposed on each outer face of said slabs parallel to the inner faces, said slabs being disposed with opposite polarization, said block being bendable alternately in two directions perpendicular to two diagonal planes intersecting in said flat electrode, diagonally aligned electrodes of each pair of electrodes being connected together outside of said block, so that the application of a bending force perpendicular to one diagonal plane of said block develops a voltage between said flat electrode and only one connected pair of electrodes and application of another bending force paralel to said diagonal plane develops a voltage between said flat electrode and only the other connected pair of electrodes, said block having a plane of mechanical symmetry lying parallel to and between said inner faces of the slabs.

14. A transducer for a stereophonic phonograph pickup, comprising a transducer including two piezoelectrically active elements secured together with a first electrode disposed between the elements, said elements being oppositely polarized, said elements having the same mechanical wave transmission properties so that the transducer is mechanically symmetrical with respect to a central plane disposed between the elements longitudinally bisecting said electrode, two spaced other electrodes extending along an outer face of one of said elements, and another two spaced electrodes extending along an outer face of the other of said elements.

15. A transducer for a stereophonic phonograph pickup, comprising two piezoelectrically active elements secured together with a first electrode disposed between the elements, said elements being oppositely polarized, said elements having the same mechanical wave transmission properties so that the transducer is mechanically symmetrical with respect to a plane lying between the elements longitudinally bisecting said electrode, and spaced electrodes on outer faces of said elements.

16. A transducer for a phonograph pickup, comprising a flat block of rectangular cross section, said block including two flat slabs having inner faces secured to opposite faces of a flat electrode, at least one of said slabs being a piezoelectric element, said electrode having its central plane coinciding with the plane of geometrical and mechanical symmetry of the block, said block having two spaced other electrodes extending along an outer face of said one slab at opposite lateral edges thereof, said block being bendable alternately in directions perpendicular to diagonal planes intersecting in said central plane, whereby independent voltages are developed between said flat electrode and the other spaced electrodes respectively.

17. A transducer according to claim 16, wherein the other of said slabs is a piezoelectrically inert element.

18. A transducer for a stereophonic phonograph pickup, comprising a flat block of rectangular cross section, said block including two flat slabs having inner faces secured to opposite faces of a thin electrode, at least one of said slabs being a piezoelectric element, said piezoelectric element having two spaced other electrodes mounted on an outer face of said one slab near adjacent diagonal plane corners of said block, and individual contact elements connecting all of the electrodes respectively with circuit means exterior of the block, said block being mechanically symmetrical and having its plane of mechanical symmetry coinciding with the first named plane, said block being bendable alternately in directions perpendicular to diagonal planes intersecting in said central plane, said resilient means being equally compliant in both of said directions of bending, whereby independent voltages are developed between said thin electrode and the respective other electrodes.

19. A transducer according to claim 18, wherein the other of said slabs is a piezoelectrically inert element.

20. A transducer for a stereophonic phonograph pickup, comprising a block including two slabs secured to opposite sides of a flat electrode, one of the slabs being a piezoelectric element, said slabs being mechanically equivalent so that the block is mechanically symmetrical, said electrode extending out of the block to provide an electrical terminal for said element, said block having two spaced other electrodes extending along an outer face of said one slab at opposite edges thereof, said block being bendable alternately in directions perpendicular to diagonal planes intersecting in said central plane, whereby independent voltages are developed between said flat electrode and the respective other electrodes.

21. A transducer according to claim 20, wherein the other of said slabs is a piezoelectrically inert element.

References Cited in the file of this patent

UNITED STATES PATENTS

| | | |
|---|---|---|
| 1,796,650 | Harrison | Mar. 17, 1931 |
| 1,869,556 | Giebe et al. | Aug. 2, 1932 |
| 2,497,108 | Williams | Feb. 14, 1950 |
| 2,699,470 | Koren | Jan. 11, 1955 |
| 2,769,867 | Crownover | Nov. 6, 1956 |
| 2,944,117 | Gray | July 5, 1960 |

FOREIGN PATENTS

| | | |
|---|---|---|
| 725,833 | Great Britain | Mar. 9, 1955 |